(12) United States Patent
Sullivan et al.

(10) Patent No.: US 6,272,887 B1
(45) Date of Patent: Aug. 14, 2001

(54) BUSHING TIP PLATE SUPPORT ASSEMBLY FOR A BUSHING IN A FILAMENT FORMING APPARATUS

(75) Inventors: Timothy Arthur Sullivan; Jack Leonard Emerson, both of Newark; William LaVerle Streicher, Granville; Kevin Dewayne Smith, Newark; Bruno Andre Purnode, Granville, all of OH (US); Kenny Alan Brown, Jackson, TN (US)

(73) Assignee: Owens Corning Fiberglas Technology, Inc., Summit, IL (US)

( * ) Notice: Subject to any disclaimer, the term of this patent is extended or adjusted under 35 U.S.C. 154(b) by 0 days.

(21) Appl. No.: 09/347,404

(22) Filed: Jul. 6, 1999

(51) Int. Cl.[7] ............................ C03B 5/182; C03B 37/085
(52) U.S. Cl. ...................... 65/495; 65/134.1; 65/134.9; 65/135.2; 65/471; 65/474; 373/28
(58) Field of Search ............................... 65/134.1, 134.9, 65/135.2, 471, 474, 495; 373/28

(56) References Cited

U.S. PATENT DOCUMENTS

| | | |
|---|---|---|
| 2,212,528 | 8/1940 | Slayter . |
| 3,013,095 | 12/1961 | Russell . |
| 3,259,479 * | 7/1966 | Tiede . |
| 3,554,718 | 1/1971 | Stalego et al. . |
| 3,810,741 | 5/1974 | Stalego . |
| 3,920,430 | 11/1975 | Carey . |
| 3,985,530 | 10/1976 | Hynd . |
| 4,003,731 | 1/1977 | Thompson . |
| 4,055,406 | 10/1977 | Slonaker et al. . |
| 4,437,869 | 3/1984 | Lecron et al. . |
| 4,518,406 | 5/1985 | Perkins et al. . |
| 4,525,188 | 6/1985 | Jensen . |
| 4,612,027 | 9/1986 | Marra . |
| 4,664,688 * | 5/1987 | Grubka et al. . |
| 5,578,101 | 11/1996 | Blonder et al. . |
| 5,928,402 * | 7/1999 | Mirth et al. . |

FOREIGN PATENT DOCUMENTS 2801949 7/1979 (DE) .

OTHER PUBLICATIONS

The fibre drawing furnace—the bushing; pp. 119–148.

* cited by examiner

Primary Examiner—Michael P. Colaianni
(74) Attorney, Agent, or Firm—Inger H. Eckert

(57) ABSTRACT

A bushing tip plate support assembly for a bushing in a filament forming apparatus is disclosed. The support assembly improves the flatness of the tip section within the spans between the external support and the center support. The filament forming apparatus includes a bushing having a bottom plate from which nozzles or tips depend. The disclosed support assembly is an improvement on the internal support assemblies in conventional bushings because it has several functions. The support assembly includes two vertical dividers mounted in the bushing. The bottom ends of the dividers are welded to the tops of tip plate gussets in the bushing. The dividers are attached to side plates of the bushing as well. An upper portion of each divider serves as an upper side wall for the bushing and defines part of the throat of the bushing into which the molten glass flows. The dividers also include middle and lower portions with perforations through which the glass in the bushing may flow. The openings permit the dividers to thermally mix and homogenize the glass within the bushing. The dividers provide additional tip plate support to conventional tip plate gussets and resistance to long term creep and sag of the bottom plate, especially at the point of maximum deflection of the tip plate.

9 Claims, 6 Drawing Sheets

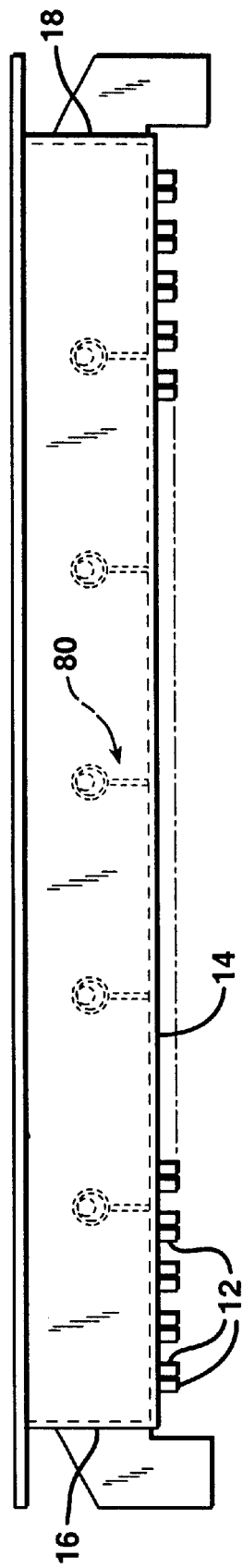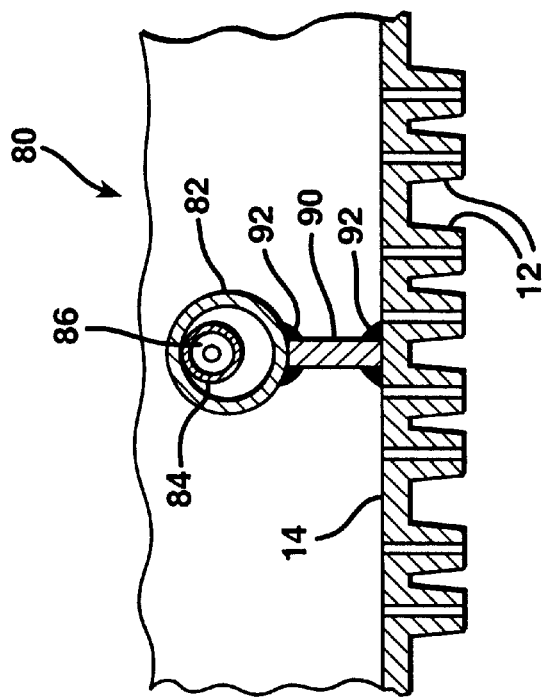
FIG. 2A PRIOR ART
FIG. 2B PRIOR ART

BUSHING TIP PLATE SUPPORT ASSEMBLY FOR A BUSHING IN A FILAMENT FORMING APPARATUS

TECHNICAL FIELD AND INDUSTRIAL APPLICABILITY OF THE INVENTION

This invention relates generally to an apparatus for and method of producing continuous glass filaments, and in particular, to a bushing tip plate support assembly for a bushing in a filament forming apparatus. The invention is useful in the production of continuous glass filaments.

BACKGROUND OF THE INVENTION

In the manufacture of continuous glass filaments, glass is melted in a glass furnace and flows through a forehearth to one or more bushings in a filament forming apparatus. Each bushing has several nozzles or tips through which streams of molten glass flow. The quenched glass streams are mechanically pulled from the nozzles by a winding apparatus to form continuous glass filaments.

Conventional bushings may be either a remelt bushing or a direct-melt bushing. A remelt bushing melts cold glass in the form of marbles or other shapes in its upper section and then conditions the glass and passes it through the bushing nozzles from which the molten glass is attenuated. A direct-melt bushing is supplied with liquid glass at the desired temperature from a continuous supply flowing above the bushing in a channel called a forehearth. The direct-melt bushing only needs to condition the molten glass to a uniform temperature before it is attenuated.

A conventional filament forming apparatus 5 with a bushing is shown in FIG. 1 and is disclosed in U.S. Pat. No. 3,920,430 to Carey (Carey), the disclosure of which is expressly incorporated herein by reference. Filaments 20 are drawn from a plurality of nozzles 12 depending from a bottom plate 14 of the bushing 10 and are gathered into a strand 22 by a roller 42. Size is applied to coat the filaments by a size applicator 40. A reciprocating device 32 guides strand 22, which is wound around a rotating collet 34 in a winding apparatus 30 to build a cylindrical package 24.

The electrically heated bushing 10 is located below and in communication with a forehearth 50 which receives refined, heat-softened or molten glass from a melting furnace 52. The bushing 10 is mounted in communication with an opening in the bottom of the forehearth 50.

Conventional bushings include side walls, end walls, and a bottom plate defining a bushing body therebetween. The bottom plate may include more than 4,000 nozzles, preferably all at or close to a uniform temperature. The bottom plate may be referred to as a nozzle plate or tip plate as well.

Bushings condition the molten glass to a uniform temperature so the filaments are attenuated with uniform diameters. The temperature of the molten glass must be high enough to maintain the glass in a liquid state. Accordingly, bushings are subjected to high temperatures over their operating life.

As they lose heat to the ambient, the filaments are attenuated from the bushing nozzles by a winding apparatus that winds one or more packages simultaneously. In order to supply a sufficient amount of filaments to a winding apparatus, bushings have increased in size.

Larger bushings encounter several problems due to their size. It is difficult to maintain the nozzle plate of a large bushing at a uniform temperature and achieve uniform diameter filaments. Also, it is difficult to minimize and control the distortion of the nozzle plate due to high operating temperatures and the weight of the molten glass in the bushing above the plate. Larger bottom plates are subjected to a greater overall load and tend to sag or creep sooner than smaller bottom plates. Hotter operating temperatures in the current state of the art processes also accelerate the high temperature creep of the tip plate alloys.

These problems result in creep and distortion of the bottom plate, which limit the useful life of a bushing. Creep is the deformation of the nozzle plate under a load and is a function of temperature and the stress on the plate. Distortion results when an insufficient allowance is made for the thermal expansion of the plate when the temperature in the bushing increases.

Several attempts have been made to solve these problems. One proposed solution involves the particular material of the bushing. Platinum materials may be used because they are resistant to oxidation and to corrosion by the glass and as a result, do not contaminate the glass. Platinum alloys are resistant to creep at elevated temperatures as well. However, pure platinum is soft and quickly distorts at high temperatures. While the addition to the platinum of an alloying material such as rhodium has proved beneficial, the particular material of the bushing alone is insufficient to eliminate the creep and distortion in the bushing bottom plate.

Another solution is to use various structures to support the bushing bottom plate. The supports used in a conventional precious metal fiberglass bushing include three principal components: a center support, an external support system, and an internal gusset system. Each of these components addresses sag, or high temperature creep, of the precious metal alloy for different areas of the bushing. Each component individually supports a different part of the bushing and it is preferable to have all three components to achieve the maximum service life for a bushing.

A conventional bushing with each of these support components is shown in FIG. 3. The bushing 10 has a center support 70 and an external support system including external support straps 60 and external support brackets 62. The bushing also has an internal support system that includes tip plate gussets 44. The bushing shown in FIG. 3 includes a frame 11, side walls 16, 18, flanges 17, 19, and a V screen 15 through which molten glass flows. Filaments of molten glass are attenuated from nozzles 12 on bottom plate 14.

The center support 70 is a flattened, water cooled nickel or stainless steel tube that is mounted beneath the tip section and external to the bushing tip plate. An example of a center support is described in detail in U.S. Pat. No. 4,055,406 to Slonaker et al. (Slonaker), which is expressly incorporated by reference herein. The function of the center support is to provide support between the two tip plates for a double bottom plate bushing configuration. For a single bottom plate bushing, the center support is the only one of the three components that is not required to support the bushing bottom plate.

The center support extends the entire length of the tip plates and is isolated from the bushing by an intermediate ceramic insulator. The relationship of the center support to a double bottom tip plate is shown in FIG. 3.

Slonaker discloses a center support that includes a tubular body disposed lengthwise of and beneath the floor section of the bushing. Cooling fluid is circulated through the tubular member to minimize or reduce distortion or sagging of both the center support and the bottom plate of the bushing.

Turning to the external support system, the external support system shifts the mechanical support of the outer perimeter of a bushing from the castable refractory, which surrounds and insulates the bushing, to a bushing frame which is a more dimensionally rigid component. An example of the external support system is shown in FIG. 3 as well.

The external support system consists of stirrups that are attached to each lower bushing side wall, ceramic insulating wafers, and stainless steel support straps 60 that extend from the stirrups to the lower surface of the bushing frame 11. The external support system is intended to maintain the dimensional stability of the tip section along the perimeter of the bushing.

The center support and the external support system are external systems that support the bushing along the perimeters of each bottom plate. Support must be provided along the interior of the bottom plate as well.

The interior portion of the bottom plate is equipped with tip orifices for metering glass flow. Some conventional bushing are used with external cooling fin blades that are located between the nozzles to insure the required thermal environment for the formation of fibers. Due to the spatial requirements of the tips and the fin blades, it is necessary to support the tip plate span between the perimeter and the area between the two tip plates with a support system inside the bushing.

Internal support components are the third element of the tip plate support system and are known as tip plate gussets. The gussets are precious metal alloy vertical stiffeners that are welded to the inside surface of the tip plate between the rows of tips that are located on the tip plate. The gussets insure maximum tip plate resistance to sag or downward deflection between the externally supported perimeters of the tip plate. An example of the location of tip plate gussets 44 and their relationship with the center support and external support systems is shown in FIG. 3.

Carey acknowledges the problem of increased sagging and warping of the bushing bottom plate as the bushing increases in size. Carey discloses a modification of the third type of support (the internal support) by strengthening the gussets in a bushing. Gussets are made of precious metal alloy since they are attached to the tip plate and are located inside the bushing. The ability of the gusset to maintain tip plate flatness is directly related to how dimensionally rigid the shape of the gusset can be maintained during operating conditions of time and temperature.

The internal support system 80 in Carey, shown in FIGS. 2A and 2B, includes an elongate, internal hollow member 82 that extends between side walls of the bushing and above the bottom plate. Plates 90 are welded to the elongate members 82 and to the bushing bottom plate 14 below the members 82 at welding points 92. The plates 90 welded to the bushing bottom plate 14 between the rows of bushing tips 12. Rods 86 of high refractory ceramic material extend through passages 84 in the elongate members 82 to stiffen the members. Holes are drilled in the lower bushing side walls at each end of a gusset. The rods 82 extend through the holes in the bushing side walls to provide additional support to the gussets.

A drawback of the support assembly of Carey is that current bushings have tip plates that are longer and wider than previous bushings. The increases in width and length require numerous gussets to be installed in a single bushing. The large quantity of gussets requires additional manufacturing time and costs to drill holes for each of the ceramic rods. Further, the holes are detrimental to both the rigidity of the bushing and the heat pattern of the bushing. A bushing with numerous holes would be more vulnerable to service life limiting glass leaks around these holes and welds.

Another drawback of the system in Carey is that the height of the gussets may be too great, thereby limiting the design of any internal screens in the bushing body. The width of the tubes at the top of the gussets can also interfere with the gusset to tip plate welding sequence.

Some conventional bushings do not have nozzles and finshields depending from the bushing bottom plate in order to reduce the bushing size. While eliminating the nozzles and finshields and using only orifices may reduce the bottom plate size, it creates the problem of glass flooding the plate whenever filament breakage occurs.

There is a need for an internal support for a bushing bottom plate that does not compromise the operability of the bushing and that does not impair the flow of molten glass in the bushing. Also, there is a need for an improved bushing bottom plate support that can also serve as a perforated heater or homogenizer of the molten glass.

SUMMARY OF THE INVENTION

The shortcomings of the prior art are overcome by the disclosed bushing tip plate support assembly for a bushing in a filament forming apparatus. The filament forming apparatus includes a bushing having a bottom plate from which nozzles or tips depend. The disclosed support assembly is an improvement on the internal support assemblies in conventional bushings because it has several functions. The support assembly includes two vertical dividers mounted in the bushing. The bottom ends of the dividers are welded to the tops of tip plate gussets in the bushing. The dividers are attached to side plates of the bushing as well. An upper portion of each divider serves as an upper side wall for the bushing and defines part of the throat of the bushing into which the molten glass flows. The dividers also include middle and lower portions with perforations through which the glass in the bushing may flow. The openings permit the dividers to thermally mix and homogenize the glass within the bushing.

The dividers also provide additional stiffness and tip plate support to conventional tip plate gussets and resistance to long term creep and sag of the bottom plate, especially at the point of maximum deflection of the tip plate. The support assembly improves the flatness of the tip section within the spans between the external support and the center support.

BRIEF DESCRIPTION OF THE DRAWINGS

FIG. 2A is a schematic side view of an internal support system for a bushing in the apparatus of FIG. 1.

FIG. 2B is a schematic section view of the internal support system of FIG. 2A.

DETAILED DESCRIPTION AND PREFERRED EMBODIMENTS OF THE INVENTION

An apparatus for supporting the bottom plate of a bushing embodying the principles of the invention is illustrated in FIGS. 4–7B. The disclosed support apparatus or system has several functions: (1) strengthening the tip plate gusset system, (2) screening and heating glass that flows to the outer periphery of the tip plate, and (3) defining a stiffer throat of the bushing to prevent flange rolling and upper body collapse in the bushing that can result in glass leaks over the flange.

Figure 1:
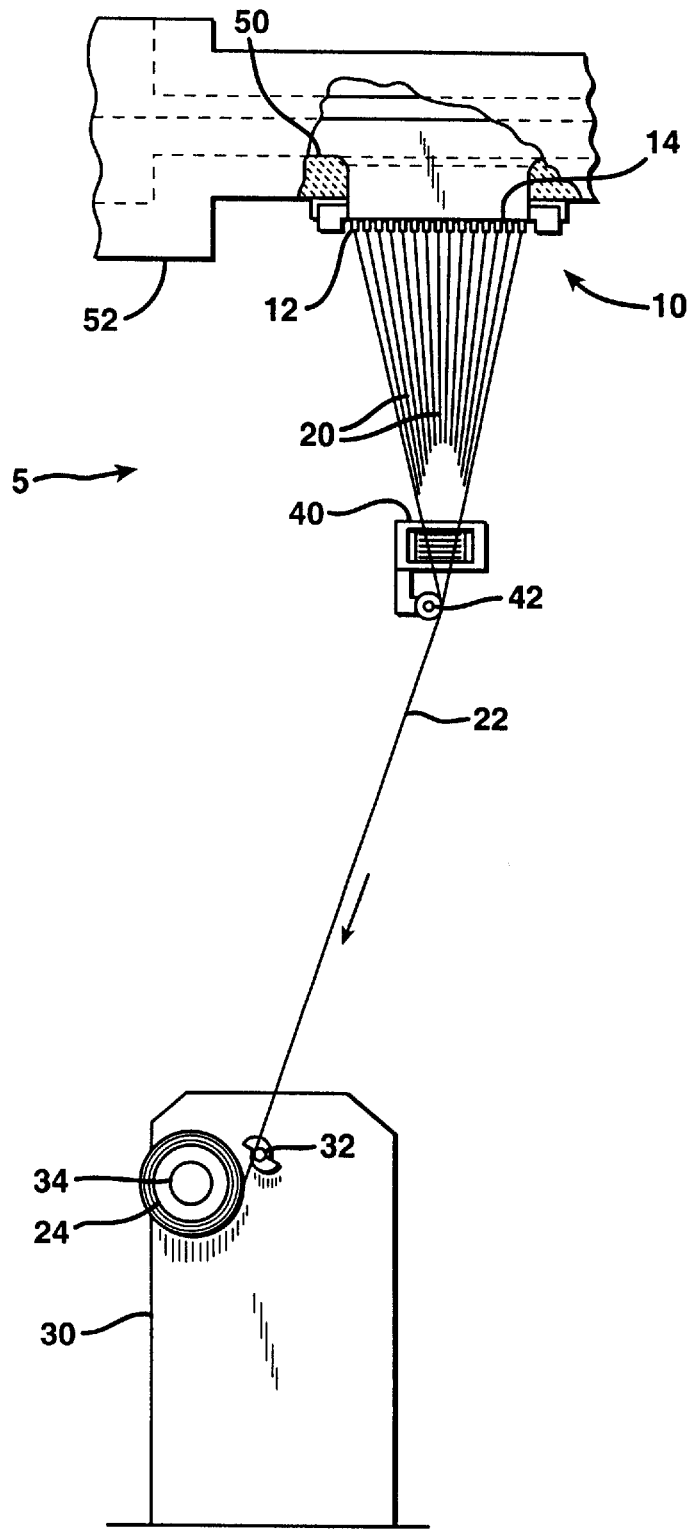
FIG. 1 is a schematic view of a conventional glass filament forming apparatus.
Figure 3:
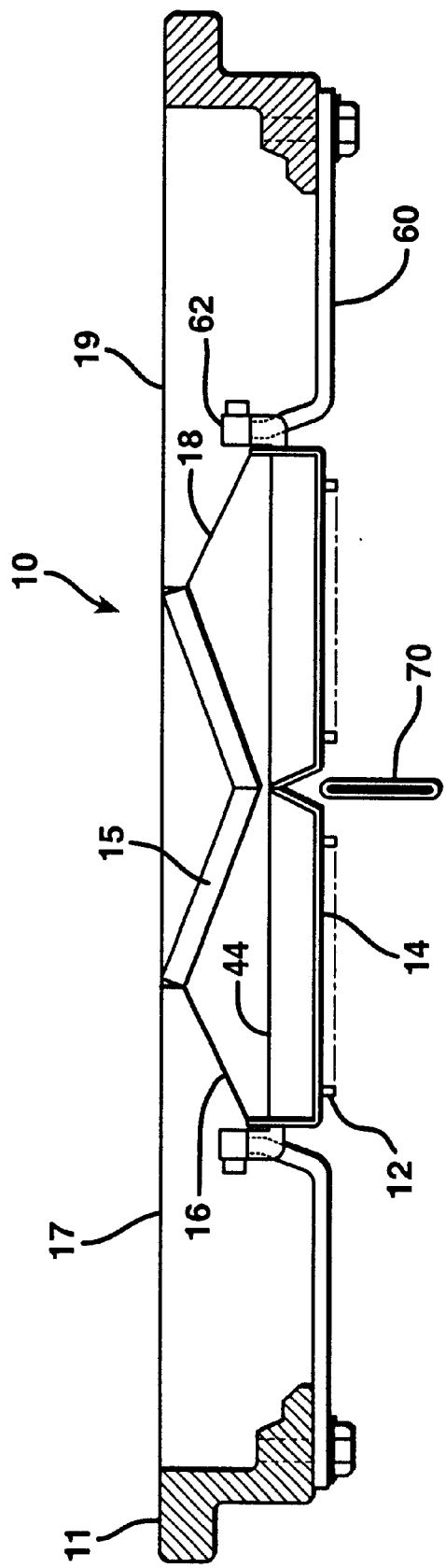
FIG. 3 is a schematic side view of a conventional bushing showing three types of support structures for a bushing.

A conventional glass filament forming apparatus with a bushing is shown in FIG. 1. Glass filament forming apparatus 5 may be of any conventional design, such as that disclosed in Carey.

Figure 4:
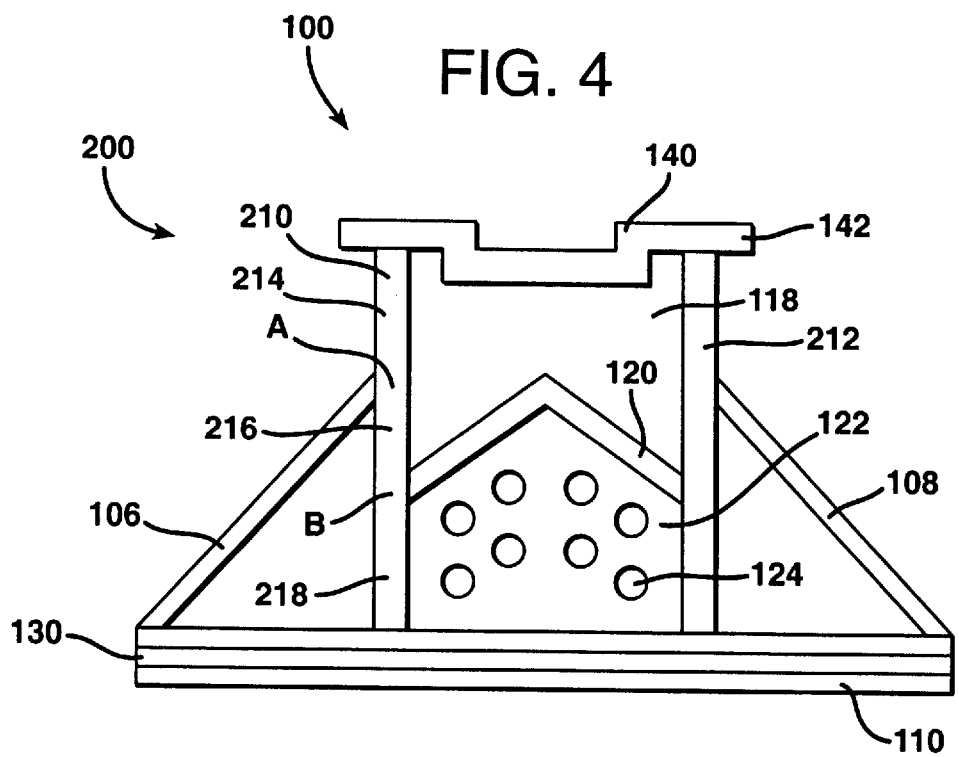
FIG. 4 is a cross-sectional end view of a bushing embodying the principles of the invention taken along the line "4—4" in FIG. 5.
Figure 5:
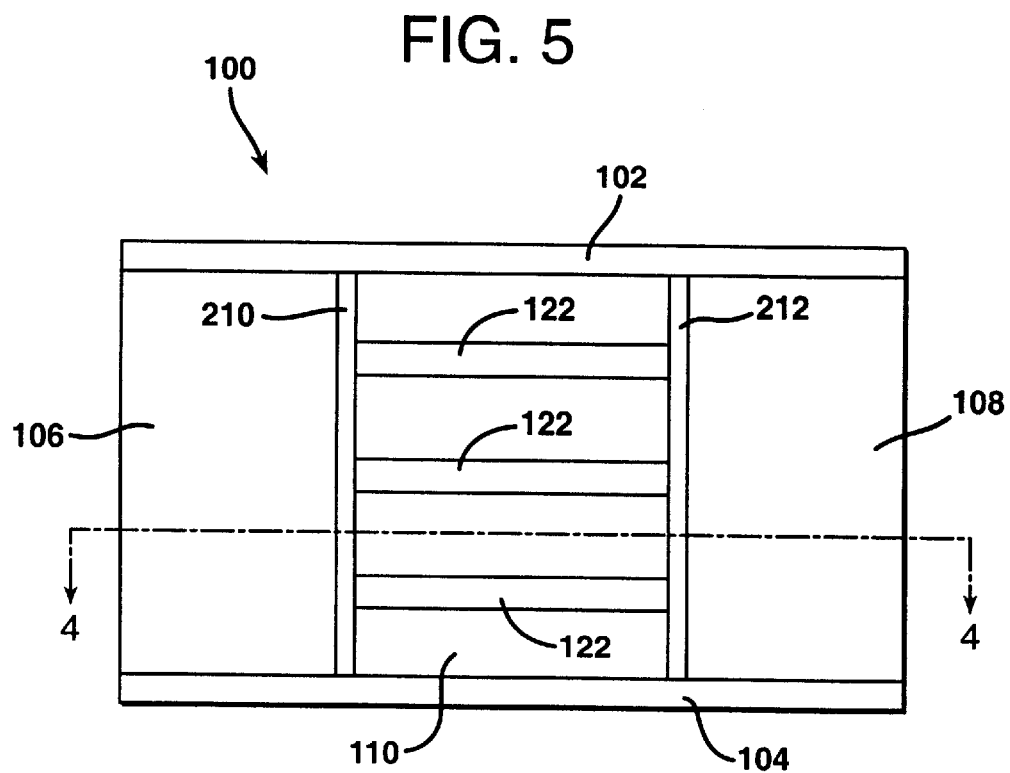
FIG. 5 is a top view of the bushing of FIG. 4.

A bushing 100 embodying the principles of the invention is shown in FIGS. 4–7B. Bushing 100 includes a bottom plate 110 from which tips or nozzles (not shown) depend as appreciated by the artisan. Bushing 100 includes spaced apart end plates 102, 104 and side plates 106, 108 as shown in FIGS. 4 and 5. Side plates 106, 108 extend between and are coupled to end plates 102, 104.

Figure 6:
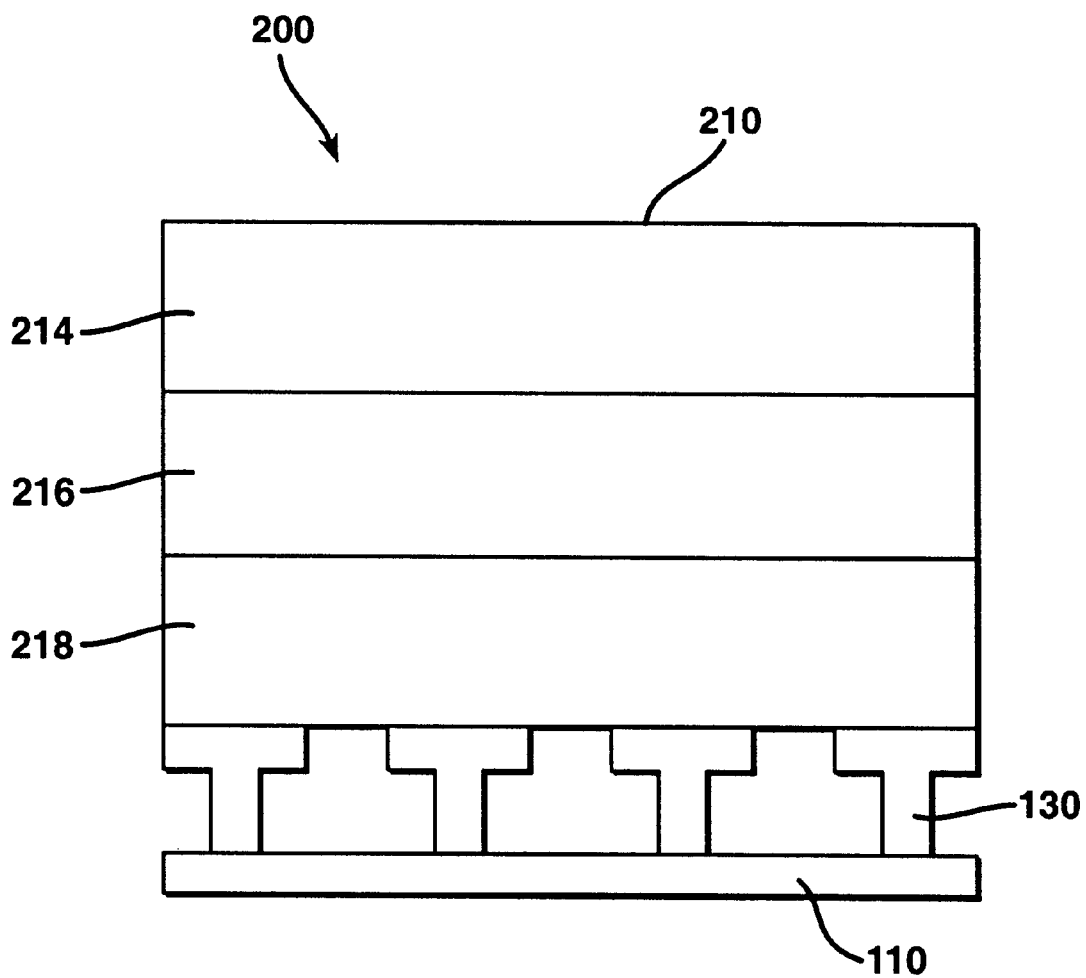
FIG. 6 is a side view of the bushing support assembly showing the relationship between vertical dividers and tip plate gussets.

Bushing 100 includes a bushing support assembly 200 with dividers 210, 212 that extend between end plates 102, 104. Dividers 210, 212 are welded at their ends to end plates 102, 104 and along their bottom surfaces to the tops of tip plate gussets 130 in the bushing 100 as shown in FIG. 6. Each side plate 106, 108 extends from the outer periphery of the bottom plate 110 of the bushing 100 to an adjacent divider 210, 212 as shown in FIG. 4.

Bushing 100 includes an inverted-V screen 120 between the dividers 210, 212. The screen 120 prevents debris from blocking an opening in the bottom plate 110 and helps thermally condition and distribute the molten glass. Screen 120 is supported by several screen support gussets 122. Each screen support gusset 122 includes perforations 124 to permit molten glass to mix and flow throughout the bushing 100.

Bushing 100 also includes a sloped recessed screen 140 with flanges 142 at the top of the bushing 100. Screen 140 prevents debris in the forehearth from entering the bushing 100. Screens 120, 140 are not shown in FIG. 5.

Each divider 210, 212 of the bushing support assembly 200 includes three different portions 214, 216, 218 as shown in FIGS. 4 and 6. Since the dividers 210, 212 are identical, only divider 210 will be discussed in detail to simplify the discussion.

The upper portion 214 of vertical divider 210 extends between the top of the divider 210 and the location where side plate 106 contacts the divider 210, designated as point A in FIG. 4. Upper portion 214 does not contain any perforations and functions as part of the bushing throat 118 as discussed above.

Figure 7A:
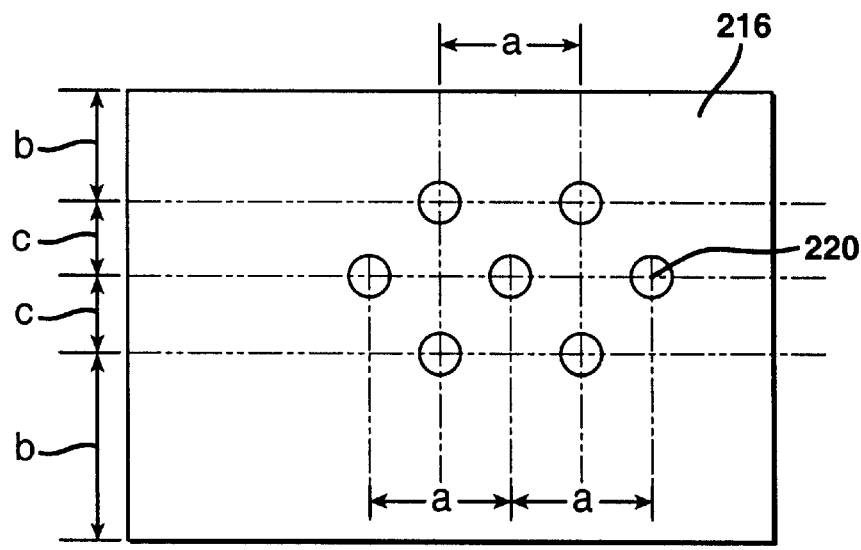
FIGS. 7A and 7B are schematic side views of the middle and lower portions of vertical dividers.
Figure 7B:
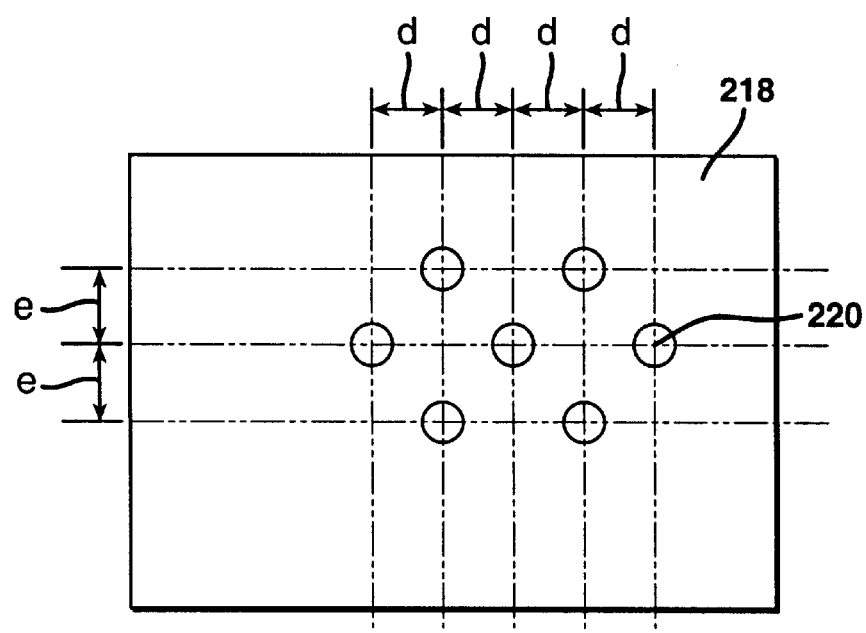

Middle portion 216 of the divider 210 is located between upper portion 214 and the location where inverted-V screen 120 contacts the divider 210, designated as point B in FIG. 4. Middle portion 216 includes perforations through which molten glass may pass. The glass passing through these perforations flows to the side areas of the bushing 100 adjacent to the side plate 106. The pattern and spacing of the perforations 220 in the middle portion 216 is shown in FIG. 7A. Exemplary dimensions for characters a, b, and c in FIG. 7A are provided in the example below.

Lower portion 218 of the divider 210 is located between point B and the bottom of divider 210. Lower portion 218 includes perforations in a pattern and spacing similar to those on the screen support gussets 122 (see FIG. 7B).

The operation of the bushing support assembly 200 will now be described with reference to FIG. 4. Dividers 210, 212 are welded to the end plates 102, 104 of the bushing. Molten glass flows through a forehearth (not shown) and through screen 140 which prevents debris, such as pieces of refractory, from entering the bushing 100. After passing through screen 140, the glass flows through a throat 118 in the bushing 100 formed by the end plates 102, 104 and the upper portions 214 of the dividers 210, 212.

Prior to contacting inverted-V screen 120, some of the glass will flow through the perforations 220 in middle portion 216 of each divider 210, 212 and down toward the bottom plate 110. Since the side plates 106, 108 do not contain any perforations, the glass will flow toward the openings in the bottom plate 110. The glass that does not pass through the perforations 220 will flow through the inverted-V screen 120.

After passing through screen 120, the glass may flow one of three ways: (1) through the perforations 124 in a screen support gusset 122, (2) through the lower portion 218 of a divider, or (3) directly through an opening in the bottom plate 110. Eventually, all of the molten glass in the bushing is attenuated from the bushing tips. The perforations in the dividers 210, 212 and the screen support gussets 122 allow molten glass in the bushing 100 to mix. The optimum mixture of glass for fiberization is one with a homogeneous temperature throughout the glass. The dividers may be heated by electrical current passing therethrough. If the dividers are heated, the homogeneity of the molten glass will improve.

The components of the internal bushing support assembly of the present invention are preferably platinum alloy.

The following dimensions are provided for an exemplary bushing support assembly bodying the principles of the invention:

height of vertical divider=2.9 in. (7.36 cm.)
width of vertical divider=23.25 in. (59.1 cm.)
thickness of vertical divider=0.5 in. (1.27 cm.)
height of upper portion of vertical divider=1.0 in. (2.54 cm.)
height of middle portion of vertical divider=1.15 in. (2.92 cm.)
height of lower portion of vertical divider 32 0.75 in. (1.91 cm.)
height of tip plate gusset=0.6 in. (1.52 cm.)
diameter of perforations/openings=0.375 in. (0.95 cm.)
dimensions for the perforations in the middle portion of a divider:
    a=0.5 in. (1.27 cm.)
    b=0.25 in. (0.64 cm.)
    c=0.325 in. (0.83 cm.)
dimensions for the perforations in the lower portion of a divider:
    d=0.5 in. (1.27 cm.)
    e=0.325 in. (0.83 cm.)

As the artisan will appreciate, the dimensions identified above may be adjusted dependent on the size of the bushing and the quantity of molten glass in the bushing.

The artisan will also appreciate that there are many possible variations on the particular embodiment described above that would be consistent with the principles of the invention.

For example, the quantity and spacing of the perforations in the dividers or the screen support gussets may be modified depending on the amount of glass flowing in the bushing.

Another alternative is that height of the lower and middle portions of the dividers may be varied dependent on the sizes of the surrounding structure in the bushing. In other words, the height of these portions correlate to the contact points of the inverted-V screen and the side plates with the divider members.

We claim:

1. A filament forming apparatus comprising:
   a bushing including end plates, side plates, and a perforated bottom plate;
   bottom plate gussets coupled to said bottom plate;
   a first divider extending between and coupled to said end plates; and
   a second divider extending between and coupled to said end plates, wherein each of said dividers is coupled to said bottom plate gussets and to one of said side plates, said first and second dividers having a first portion and a second portion, said second portion including perforations therethrough through which molten glass in the bushing may flow.

2. The filament forming apparatus of claim 1, wherein said second portion perforations are disposed in a pattern, and said first and second dividers further includes a third portion, said third portion including perforations therethrough, said third portion perforations being disposed in a pattern different from the pattern of said second portion perforations.

3. The filament forming apparatus of claim 2, wherein said bushing further includes a screen mounted between said end plates and said side plates with a first end of said screen positioned adjacent to said first and second dividers between said second and third portions.

4. The filament forming apparatus of claim 1, wherein said end plates and said first portion of said first and second dividers define therebetween a portion of a throat through which molten glass can flow from a forehearth to said bushing.

5. The filament forming apparatus of claim 1, wherein a first one of said side plates is coupled at a first, upper end to said first divider and at a second, lower end to an end of said bottom plate, said first side plate angling downwardly and outwardly from said first divider to said bottom plate, whereby a portion of molten glass flowing through the bushing may flow through said perforations in said second and third portions and near said first side plate before exiting said bushing through said bottom plate.

6. The filament forming apparatus of claim 5, wherein said upper end of said first side plate is positioned adjacent to said first divider between said first and second portions.

7. The filament forming apparatus of claim 3, wherein said bushing includes a support for supporting said screen, said screen support defining perforations in a pattern substantially similar to the pattern of said third portion perforations.

8. A method of supporting a bottom plate of a bushing having end plates and side plates coupled to the bottom plate, the method comprising the steps of:
   coupling to said bushing bottom plate support gussets;
   disposing first and second dividers in the bushing, said first and second dividers having a first portion and a second portion, said second portion having perforations therethrough through which molten glass flowing through the bushing may flow; and
   coupling said first and second dividers to the end plates and to the gussets to structurally couple said bottom plate to, and to support said bottom plate and said gussets from, said first and second dividers and said end plates, wherein each of said first and second dividers is coupled to one of said side plates.

9. The method of claim 8, further comprising the step of:
   mounting a screen between said end plates, wherein one end of the screen is positioned adjacent to said second portion of said first divider.

* * * * *